United States Patent
Santoianni et al.

(10) Patent No.: US 9,574,770 B2
(45) Date of Patent: Feb. 21, 2017

(54) START-UP TORCH

(71) Applicant: Alter NRG Corp, Calgary (CA)

(72) Inventors: James Santoianni, Greensburg, PA (US); Aleksandr Gorodetsky, Calgary (CA)

(73) Assignee: Alter NRG Corp., Calgary, Alberta (CA)

( * ) Notice: Subject to any disclaimer, the term of this patent is extended or adjusted under 35 U.S.C. 154(b) by 227 days.

(21) Appl. No.: 13/860,662

(22) Filed: Apr. 11, 2013

(65) Prior Publication Data

US 2013/0273480 A1    Oct. 17, 2013

Related U.S. Application Data

(60) Provisional application No. 61/625,398, filed on Apr. 17, 2012.

(51) Int. Cl.
| | |
|---|---|
| *F23D 11/44* | (2006.01) |
| *F23D 14/66* | (2006.01) |
| *F23D 14/22* | (2006.01) |
| *F23D 14/78* | (2006.01) |
| *F23L 15/00* | (2006.01) |

(52) U.S. Cl.
CPC ............... *F23D 14/66* (2013.01); *F23D 14/22* (2013.01); *F23D 14/78* (2013.01); *F23L 15/00* (2013.01)

(58) Field of Classification Search
CPC .......... F23D 14/20; F23D 14/22; F23D 14/66; F23D 14/78; F23L 15/00
USPC .......................................................... 431/11
See application file for complete search history.

(56) References Cited

U.S. PATENT DOCUMENTS

| | | | | |
|---|---|---|---|---|
| 3,253,906 | A | * | 5/1966 | Secord .............................. 75/658 |
| 3,972,704 | A | * | 8/1976 | Loxley .................... C03B 19/06 |
| | | | | 165/236 |
| 4,072,502 | A | * | 2/1978 | Santen et al. ................ 75/10.19 |
| 4,378,974 | A | | 4/1983 | Petit et al. |
| 4,455,165 | A | | 6/1984 | Santen et al. |
| 4,508,040 | A | * | 4/1985 | Santen .................... C10B 19/00 |
| | | | | 110/345 |
| 4,519,835 | A | | 5/1985 | Gauvin et al. |
| 4,668,853 | A | | 5/1987 | Fey et al. |
| 4,707,183 | A | | 11/1987 | Michard et al. |
| 4,761,793 | A | * | 8/1988 | Digne et al. .................... 373/24 |

(Continued)

FOREIGN PATENT DOCUMENTS

| | | |
|---|---|---|
| JP | 05106826 | 4/1993 |
| JP | 2001289419 | 10/2001 |

(Continued)

*Primary Examiner* — Kenneth Rinehart
*Assistant Examiner* — Logan Jones
(74) *Attorney, Agent, or Firm* — Robert P. Lenart, Esq.; Pietragallo Gordon Alfano Bosick & Raspanti, LLP

(57) ABSTRACT

An apparatus includes a tuyere, a plasma torch positioned to inject hot gas into the tuyere, and a plurality of nozzles configured to inject a combustible material into the tuyere for combustion of the combustible material within the tuyere. The apparatus can be used to practice a method including: injecting a combustible material into a plurality of tuyeres in a wall of a reactor vessel, using a plasma torch to inject hot gas into the tuyeres to ignite the combustible material, and directing heat from combustion of the combustible material into the reactor vessel to preheat the reactor vessel.

9 Claims, 5 Drawing Sheets

(56) References Cited

U.S. PATENT DOCUMENTS

| | | | |
|---|---|---|---|
| 4,771,993 A | | 9/1988 | Zanetta et al. |
| 4,793,798 A | * | 12/1988 | Sabin ............................ 431/90 |
| 4,998,486 A | | 3/1991 | Dighe et al. |
| 5,004,888 A | | 4/1991 | Wolf et al. |
| 5,145,491 A | | 9/1992 | Schmitt et al. |
| 5,637,127 A | | 6/1997 | McLaughlin et al. |
| 5,655,899 A | * | 8/1997 | Hura ....................... F23C 6/047 |
| | | | 431/174 |
| 5,965,039 A | | 10/1999 | Kitahashi et al. |
| 5,975,887 A | * | 11/1999 | Kamal et al. ................. 431/181 |
| 6,033,447 A | | 3/2000 | Moock et al. |
| 6,155,818 A | * | 12/2000 | Joshi et al. ..................... 431/12 |
| 6,187,226 B1 | | 2/2001 | Detering et al. |
| 7,632,394 B2 | * | 12/2009 | Dighe et al. .................... 208/75 |
| 2007/0284343 A1 | | 12/2007 | Choi |
| 2009/0307974 A1 | | 12/2009 | Dighe et al. |
| 2010/0154304 A1 | | 6/2010 | Tsangaris et al. |
| 2010/0199557 A1 | | 8/2010 | Dighe et al. |
| 2011/0062013 A1 | | 3/2011 | Tsangaris et al. |
| 2012/0100497 A1 | * | 4/2012 | Joo ....................... F23D 11/443 |
| | | | 431/258 |

FOREIGN PATENT DOCUMENTS

| | | |
|---|---|---|
| WO | 2008150570 A1 | 12/2008 |
| WO | 2011114118 A2 | 9/2011 |

\* cited by examiner

START-UP TORCH

CROSS-REFERENCE TO RELATED APPLICATION

This application claims the benefit of U.S. Provisional Patent Application Ser. No. 61/625,398, filed Apr. 17, 2012, and titled "Start-Up Torch", which is incorporated herein by reference.

FIELD OF THE INVENTION

The invention relates to plasma torches that can be used in combination with reactors for gasification or vitrification of a wide variety of materials.

BACKGROUND

Plasma gasification reactors (sometimes referred to as PGRs) are a type of pyrolytic reactor known and used for treatment of any of a wide range of materials including, for example, scrap metal, hazardous waste, other municipal or industrial waste and landfill material, and vegetative waste or biomass to derive useful material, e.g., metals, or a synthesis gas (syngas), or to vitrify undesirable waste for easier disposition. In the present description "plasma gasification reactor" and "PGR" are intended to refer to reactors of the same general type whether applied for gasification or vitrification, or both. Unless the context indicates otherwise, terms such as "gasifier" or "gasification" used herein can be understood to apply alternatively or additionally to "vitrifier" or "vitrification", and vice versa.

PGRs and their various uses are described in, for example, U.S. Pat. No. 7,632,394 by Dighe et al., issued Dec. 15, 2009, entitled "System and Process for Upgrading Heavy Hydrocarbons"; U.S. Patent Application Publication No. 2009/0307974 by Dighe et al., entitled "System and Process for Reduction of Greenhouse Gas and Conversion of Biomass"; and U.S. Patent Application Publication No. 2010/0199557 by Dighe et al., entitled "Plasma Gasification Reactor", all of which are incorporated by reference herein for their descriptions of PGRs and methods practiced with them.

Heat from an electric arc can be fed into a cupola, furnace, or other reactor vessel to enhance the operation thereof by providing a very hot gas stream which may be either oxidizing or reducing and can also be mixed with particulate material. The electric arc can be produced in a plasma torch in which the electric arc ionizes the gas which is blown out of the end of the torch producing a hot gas stream which generally operates in the range of, for example, 10,000° F. or 5,538° C.

Typically such reactor vessels must be preheated during a start-up process. Burners for natural gas or other combustible fluids may be included to perform the pre-heating. Such burners may be removed after pre-heating is completed. Such burners may also require dedicated ports on the reactor for installation and removal and can pose a challenge operationally to do so safely. It would be desirable to have an alternative way to preheat the reactor.

SUMMARY

In one aspect an apparatus includes a tuyere, a plasma torch positioned to inject hot gas into the tuyere, and a plurality of nozzles configured to inject a combustible material into the tuyere for combustion of the combustible material within the tuyere.

In another aspect, a method includes: injecting a combustible material into a plurality of tuyeres in a wall of a reactor vessel, using a plasma torch to inject hot gas into the tuyeres to ignite the combustible material, and directing heat from combustion of the combustible material into the reactor vessel to preheat the reactor vessel. Shroud air can be used to cool the walls of the chamber as well as to supply sufficient air for combustion of the combustible material.

DETAILED DESCRIPTION

In one aspect, the present invention relates to plasma torch assemblies that can be used to preheat a reactor vessel, such as a gasification or vitrification reactor. Such plasma torch assemblies are sometimes referred to herein as start-up torches.

Figure 1:
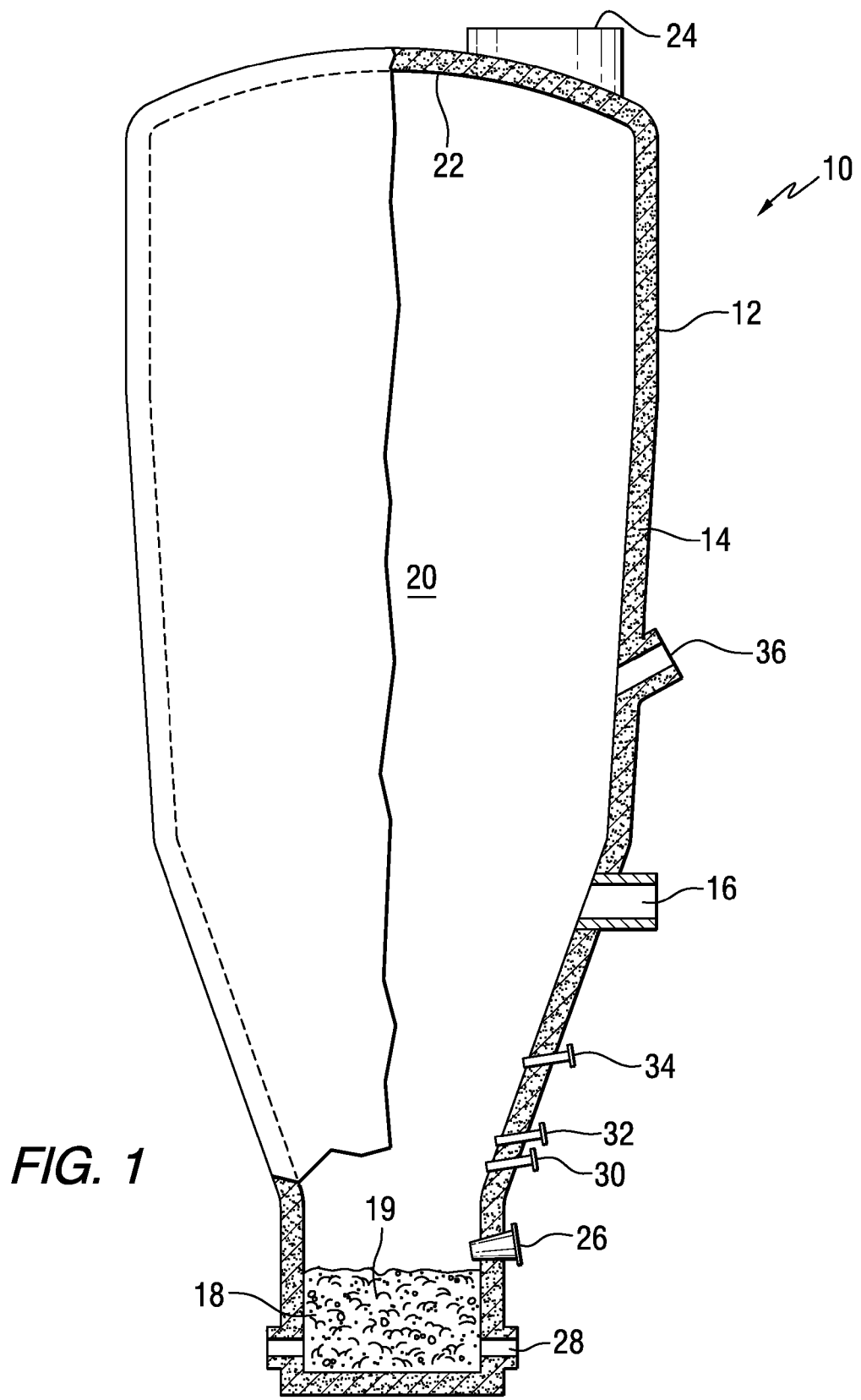
FIG. 1 is an elevation view, partially in section, of an example of a plasma gasification reactor.

FIG. 1 is an example of a plasma gasification reactor (PGR) that may be used for gasification and/or vitrification of various process materials. One manner of operating such a PGR is for gasifying material to produce a syngas from a feed material. The feed material may include, as examples, one or more of materials such as biomass, municipal solid waste (MSW), coal, industrial waste, medical waste, hazardous waste, tires, and incinerator ash. In some installations, the PGR can produce syngas that contains useful amounts of hydrogen and carbon monoxide for subsequent use as a fuel.

The reactor of FIG. 1, shown vertically sectioned in its right half, has a reactor vessel, furnace, or cupola 10, generally including a steel shell 12 lined with a refractory material 14. One or more ports 16 are provided to insert process material into the reactor vessel. A bottom portion 18 contains a charge bed, also called a carbonaceous bed 19, above which is a section for a charge bed of process material, such as biomass, municipal solid waste (MSW), coal, industrial waste, medical waste, hazardous waste, tires, and/or incinerator ash, with a freeboard region 20 above the charge bed. The freeboard region extends up to a roof 22. One or more outlets, such as pipe 24, are used to extract syngas from the vessel. The vessel can include a partial water quench zone at or near the top portion.

The portion 18 of reactor vessel 10 enclosing the carbonaceous bed has one or more (typically two to eight) nozzles 26 (sometimes alternatively referred to as ports or tuyeres) connected to a like number of plasma torches (not shown) for injecting a high temperature plasma heated gas into the carbonaceous bed and/or the charge bed. The plasma nozzles 26 may additionally be arranged to introduce additional process material that may be desired, such as a gas or liquid (e.g., steam) or some solid particulates, for reactions within the carbonaceous bed with the material of the charge bed.

The reactor vessel 10 may also contain molten slag at the bottom and includes a molten slag outlet 28, also called a taphole.

A part of the reactor vessel 10 that is around the charge bed and above the carbonaceous bed further may include some additional nozzles or tuyeres 30, 32, 34, 36 that usually, do not contain plasma torches but provide for the introduction into the charge bed of further process material, if desired, such as materials in the form of a gas, liquid, or solid particulates.

The freeboard region 20 of the reactor vessel in this example is arranged with one or more process material feed chutes 16. Here, one feed chute 16 is shown in a side wall. More generally, one or more feed chutes can be positioned at various locations in the side wall of the reactor vessel 10 or the roof 22 for depositing feed material initially onto the carbonaceous bed as well as during operation of the reactor to add to the charge bed as its process material is diminished by the reactions that take place in the reactor.

The roof 22 encloses the top of the reactor vessel 10 except for one or more outlet ports 24 for gaseous reaction products (e.g., syngas) to exit from the reactor vessel 10. Gas outlet ports may be variously provided either in the roof 22 or the sidewall of the reactor vessel 10. Where feed material introduced through any feed chutes includes particulates, it may be desirable for any gas outlet ports 24 to be located far enough away from the point of entry of the feed material to avoid excessive exiting of unreacted particulate matter through the gas outlet ports.

The ports, feed nozzles and tuyeres are used to inject various materials or gases into the reactor depending upon the process to be carried out in the reactor. In one example, material to be processed, such a municipal waste is inserted through port 16 and falls onto a carbonaceous bed in a bottom portion 18 of the reactor vessel. A plurality of plasma torches coupled to tuyeres, such as tuyere 26, are used to inject hot gases to heat the carbonaceous bed and material to be processed. The resulting gases can be extracted through one or more ports, such as port 24. Slag is extracted though port 28. A practical reactor vessel may include other elements that are not relevant to the present invention. The present invention, however, is not restricted to reactors with such configurations. Prior to the introduction of the process material, the refractory lined process vessel must be preheated to its operating temperature. In addition, the carbonaceous bed 19 requires preheating. The torch/tuyere assemblies described herein include means for using a combustible material to preheat the vessel and the carbonaceous bed.

Figure 2:
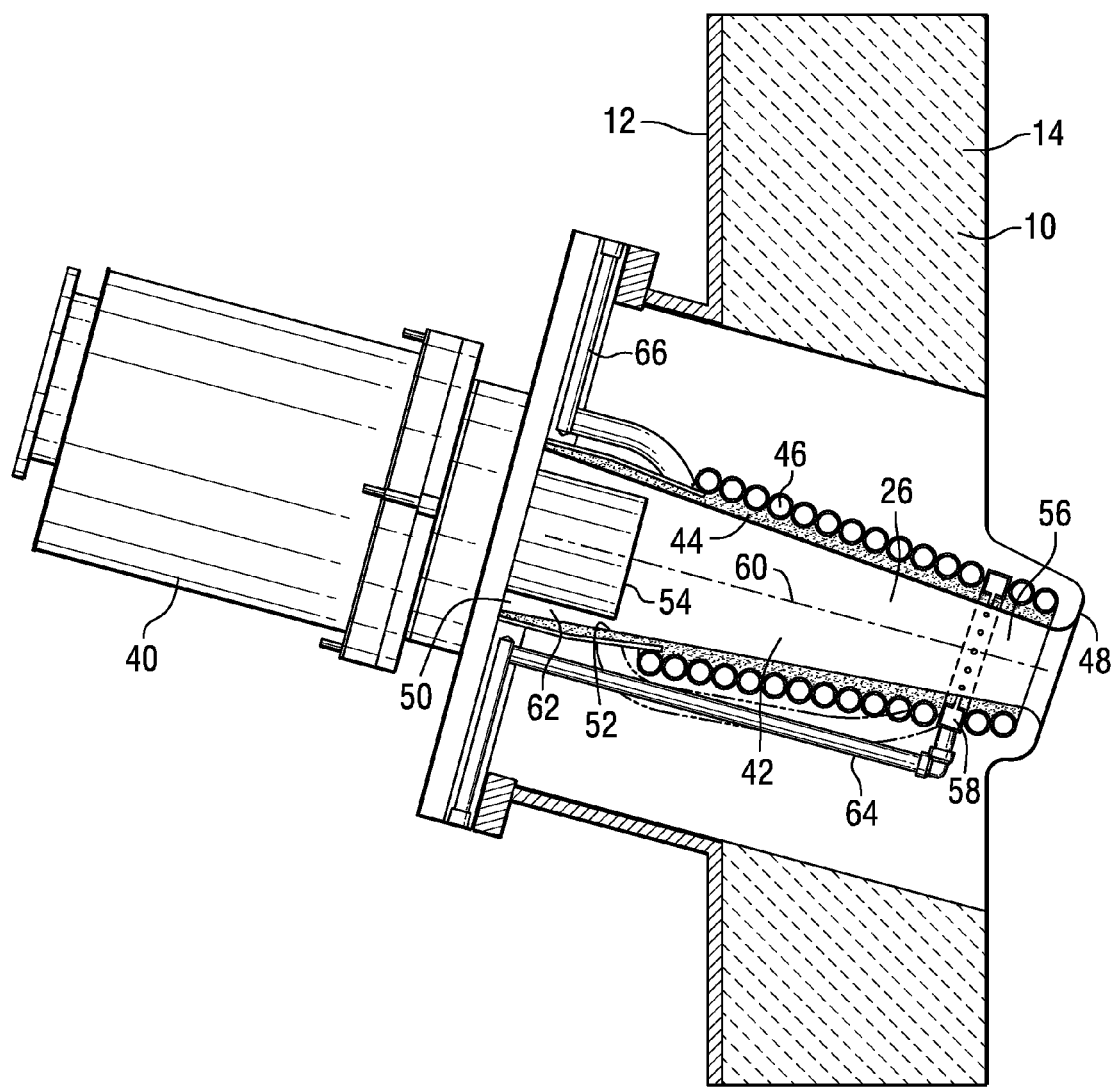
FIG. 2 is a side view, partially in section, of a plasma torch and an associated tuyere.
Figure 3:
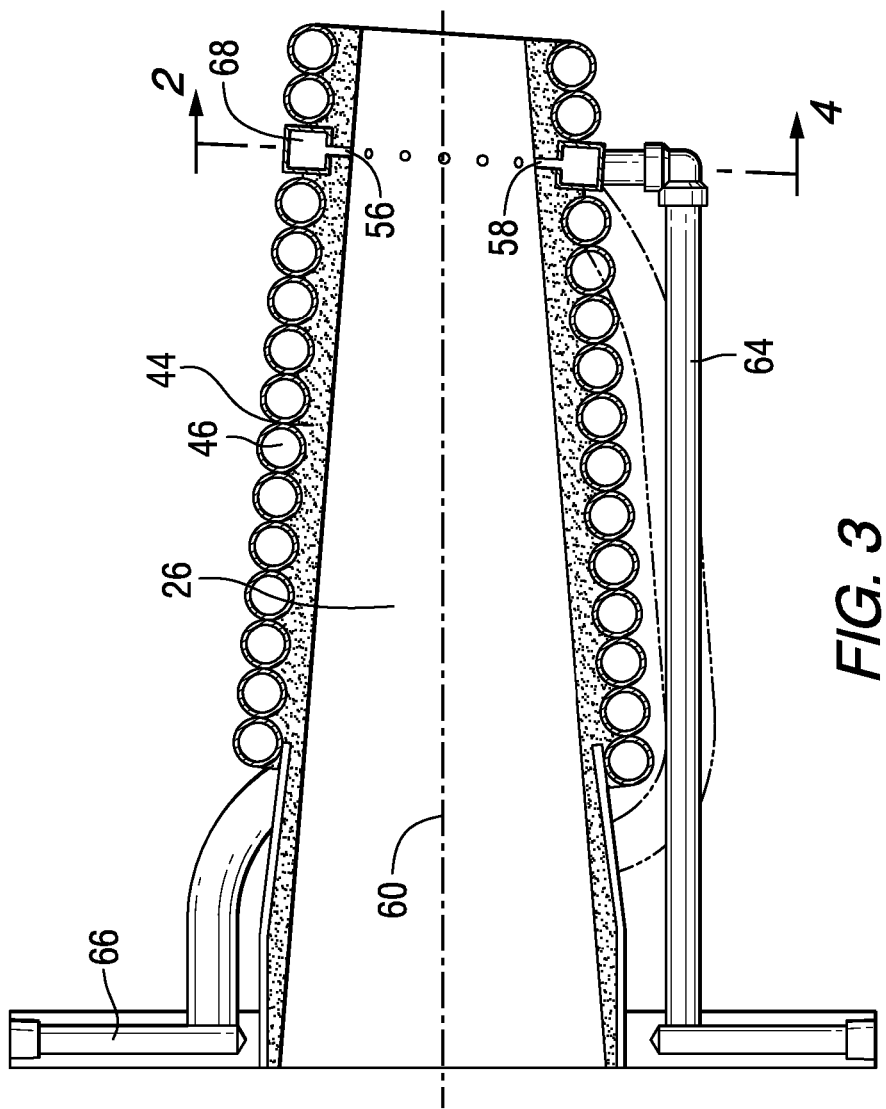
FIG. 3 is a side view, partially in section, of a tuyere.

FIG. 2 is a side view, partially in section, of a start-up torch assembly including a plasma torch 40 and an associated nozzle or tuyere 26. FIG. 3 is a side view, partially in section, of the tuyere of FIG. 2. The tuyere comprises a tubular chamber 42 lined with one or more layers of refractory material 44 and may be encircled by a cooling jacket 46, or cooling coil, through which a cooling fluid such as water is passed. In the embodiment of FIG. 2, the interior opening of the chamber is tapered such that the cross-sectional area of the opening is large at an end adjacent to the torch as compared to the cross-sectional area of the outlet of the chamber. This tapered shape can be provided by a frustoconical interior surface of the chamber. The chamber 42 includes one end 48 positioned to extend into the reactor vessel 10. The plasma torch 40 is positioned adjacent to a second end 50 of the chamber 42 opposite the end (or outlet) that opens into the reactor vessel. A plenum chamber, not shown in this view, may also be positioned adjacent to the chamber. The plenum can be configured to inject shroud gas, such as air, adjacent to the wall 52 of the chamber. In one example, a flange adjacent to end 50 can include passageways for air flow that directs shroud gas into the tuyere. In that case, the flange itself acts as the plenum chamber or shroud head assembly. The shroud gas protects the refractory material 44 lining the wall of the chamber from the extreme temperatures of hot gases emanating from a nozzle 54 of the plasma torch. In this example, the tubular chamber is tapered so that the end open into the reactor vessel is smaller than the end adjacent the plenum chamber. However, the invention is not limited to tapered tubular chambers. For example, in other embodiments the chamber can have a cylindrical interior opening.

Various structure for introducing a shroud gas into chambers or tuyeres are shown in U.S. Pat. No. 4,761,793 by Dighe et al., for a "Plasma Fired Feed Nozzle", which is hereby incorporated by reference.

In one embodiment, shroud gas can be introduced into the chamber in a direction tangentially disposed with respect to the chamber wall, such that the shroud gas follows a helical path along the chamber wall as it travels toward the reactor vessel. In another embodiment, the shroud gas can be injected in an axial direction. The plasma torch such as the Marc-11 manufactured by Westinghouse Plasma Corporation, a division of Alter NRG Corp., has a plasma nozzle 54 which extends into the chamber to provide a blast of flame-like superheated gas to the central portion of the chamber. The temperature of the superheated gas entering the chamber can be, for example, in the range of 10,000° F. (5,538° C.).

A plurality of feed nozzles 56, 58 are disposed in fluid communication with the chamber. In one embodiment, the feed nozzles are directed perpendicular to the axis 60 of the chamber. In another embodiment, the feed nozzles can form an acute angle with the axis of the chamber. The feed nozzles are used to inject a combustible material (such as, for example natural gas, fuel oil, other liquid fuels, or coal fines via a pneumatic conveyance) into the chamber. The feed nozzles 56, 58 can be positioned at various locations along the wall of the chamber.

As shown in FIG. 2, the chamber may extend at least partially through the refractory lining of the reactor vessel, or the chamber may abut the reactor vessel's outer wall when there is an opening in the vessel wall and refractory lining which registers with the open end of the chamber.

In some embodiments, the chamber may include walls which taper inwardly toward the open end, with an annular opening 62 between the refractory wall and the nozzle of the plasma torch. The tangentially disposed shroud gas plenum provides a swirling motion to the shroud gas entering the plenum chamber producing a temperature profile across the chamber which is substantially hotter in the central portion thereof than adjacent the walls. The refractory material adjacent to the wall of the chamber may be made of two or more refractory liners facilitating replacement of the inner lining which is subject to wear. A pipe 64 is configured to deliver a combustible material to a plenum 68 coupled to nozzles 56, 58. Pipe 66 is configured to deliver coolant to the cooling jacket. The cooling water return line is not shown.

Figure 4:
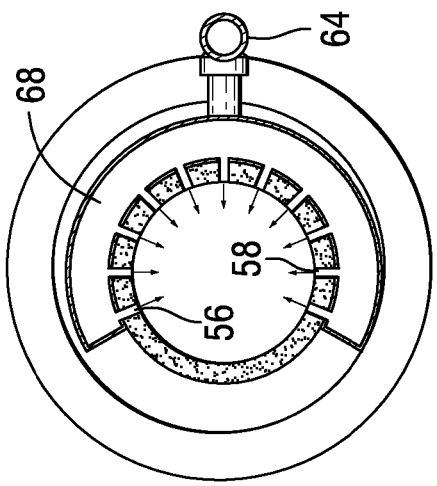
FIG. 4 is a cross-sectional view of the tuyere of FIG. 3, taken along line 4-4.

FIG. 4 is a cross-sectional view of the tuyere of FIG. 3, taken along line 4-4. In FIG. 4, the nozzles 56, 58 are shown to inject a combustible gas radially into the tuyere. To provide a source of supplemental heat to the reactor vessel, the combustible material that is injected through nozzles 56, 58 can be ignited by the plasma torch and the resulting heat is directed into the vessel for refractory heating or toward the carbonaceous bed when a carbonaceous bed has been established within the vessel.

Figure 5:
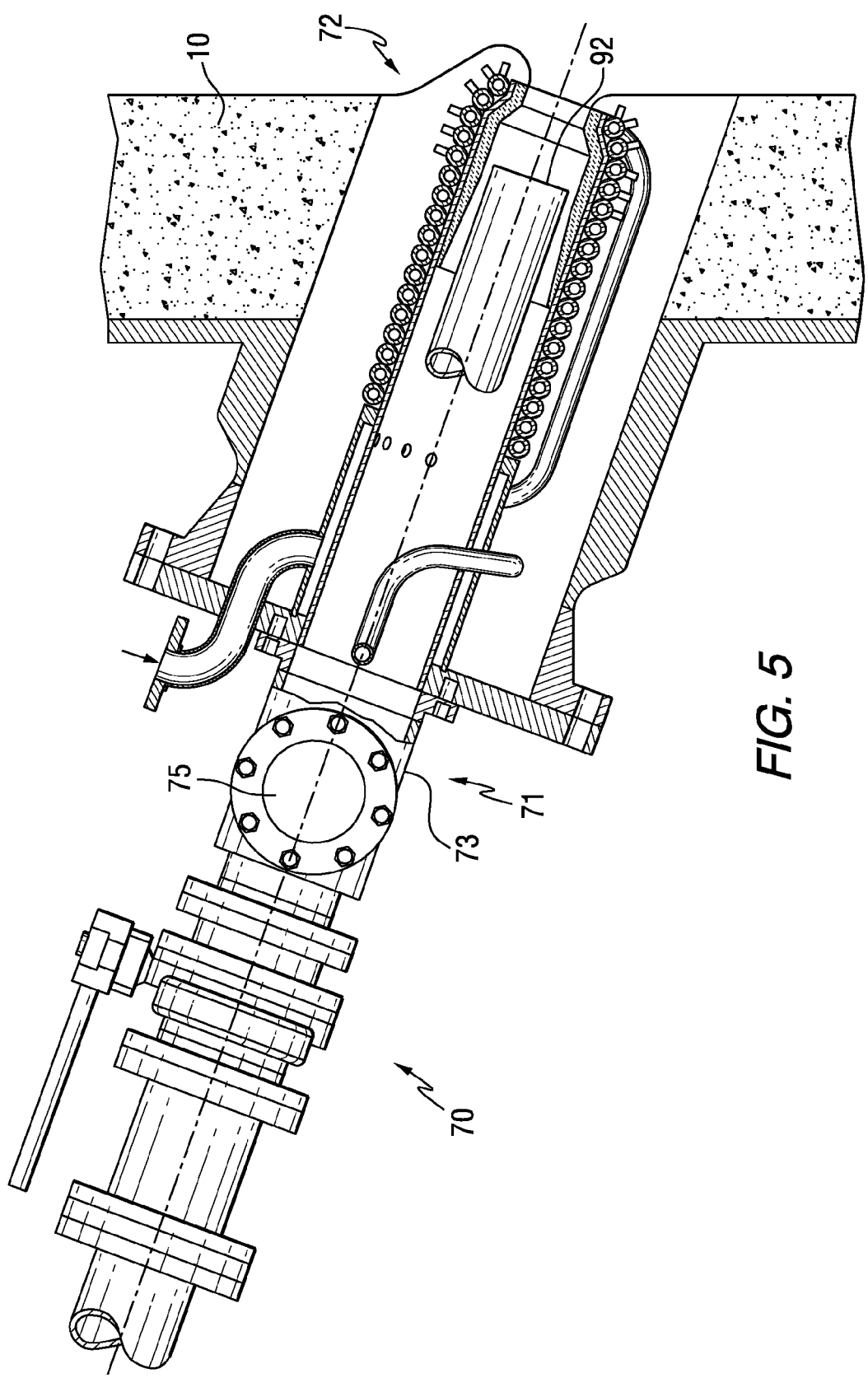
FIGS. 5 and 6 are side views, partially in section, of another plasma torch and an associated tuyere.
Figure 6:
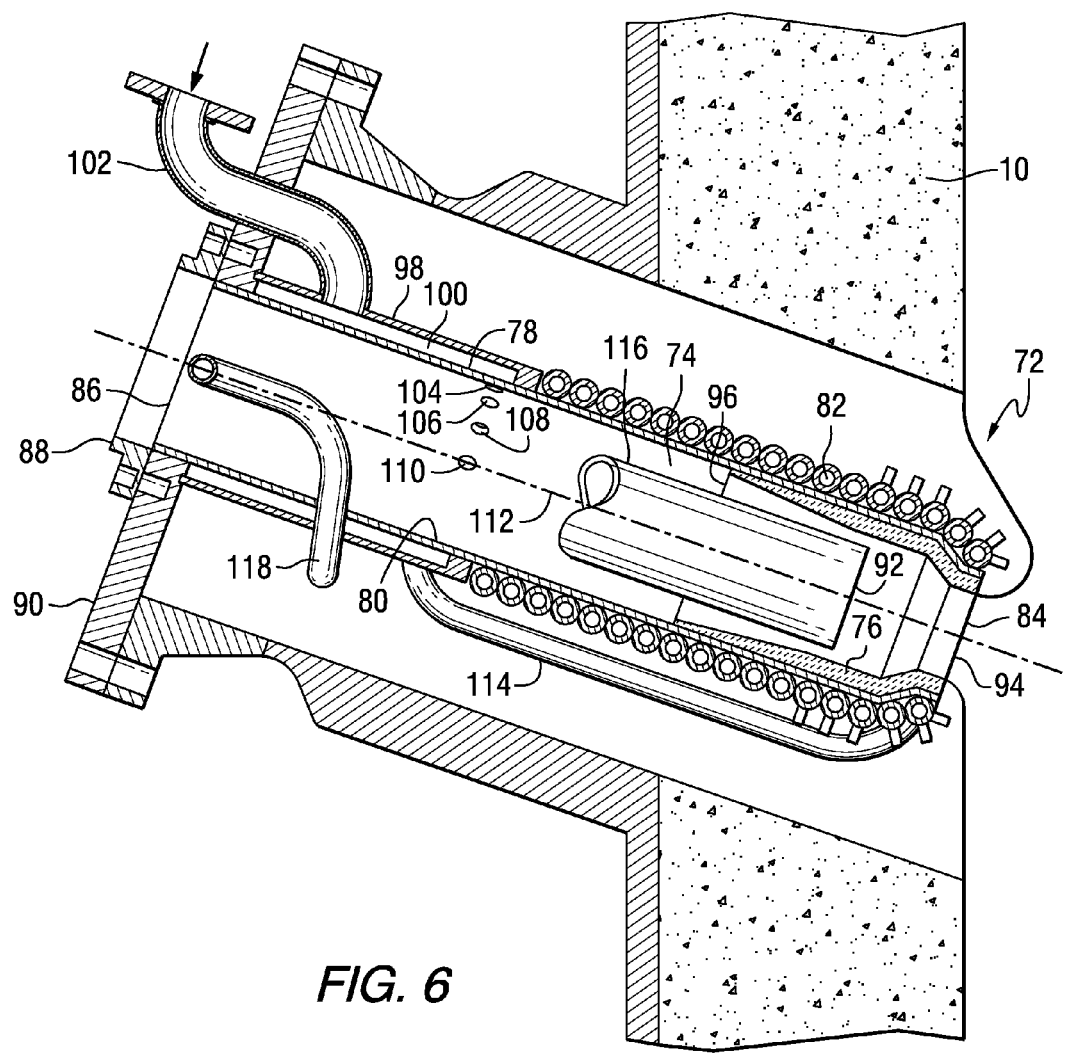

FIGS. 5 and 6 are side views, partially in section, of another start-up torch assembly including a plasma torch assembly 70 and an associated nozzle or tuyere 72. The nozzle comprises a tubular chamber 74 at least partially lined with one or more layers of refractory material 76. A mandrel 78 defines an internal surface, or wall, 80 of the chamber. The mandrel is at least partially encircled by a cooling jacket 82, or cooling coil, through which a cooling fluid such as water is passed. In the embodiment of FIGS. 5 and 6, the chamber 74 includes one end 84 positioned to extend into the reactor vessel 10. The plasma torch assembly includes a torch 116 that has a tubular structure and extends into the tuyere and is positioned adjacent to the outlet end of the chamber 74 that opens into the reactor vessel. The plasma torch assembly further includes a shroud head 71 that is used to inject a shroud gas around the tubular structure of the torch. The shroud head in this embodiment includes a tee structure 73 having an inlet 75 and an outlet 86. An annular space 88 is positioned adjacent to the second end of the chamber. The shroud head assembly can be configured to inject shroud gas, such as air, adjacent to the wall 80 of the chamber. In one example, a flange 90 adjacent to end 86 can include passageways for air flow that directs shroud gas into the tuyere. In that case, the flange itself acts as the plenum chamber or shroud head assembly. The shroud gas protects the wall of the chamber and the refractory material 76 lining the wall of the chamber from the extreme temperatures of hot gases emanating from a nozzle 92 of the plasma torch. In this example, the refractory material lining is tapered so that the end 94 open into the reactor vessel is smaller than the upstream end 96. This configuration is used when it is desirable to increase the velocity of the mixed gases leaving the tuyere; however, straight outlets and/or diverging outlets are not precluded depending on the required duty of the plasma heated gases.

Shroud gas can be introduced into the chamber in a direction tangentially disposed with respect to the chamber wall, such that the shroud gas follows a helical path along the chamber wall as it travels toward the reactor vessel. The plasma torch provides a blast of flame-like superheated gas to the central portion of the chamber. The torch in this embodiment has a pipe configuration which allows the torch to be inserted fully down the tuyere and a plasma plume very near the tuyere exit. In one example, a plasma torch such as the Marc-3 manufactured by Westinghouse Plasma Corporation, a division of Alter NRG Corp. can be used. The end of the torch can be recessed only a few inches from the outlet end of the tuyere. The temperature of the superheated gas of the plasma plume entering the chamber can be, for example, in the range of 10,000° F. (5,538° C.).

A pipe 98 positioned around at least a portion of the mandrel forms a plenum 100. A combustible material can be injected into the plenum through pipe 102. A plurality of openings 104, 106, 108 and 110 in the mandrel wall serves as feed nozzles for injecting the combustible material into the chamber. In one embodiment, the feed nozzles are configured to direct the combustible material in a direction perpendicular to the axis 112 of the chamber. In another embodiment, the feed nozzles can form an acute angle with the axis of the chamber. The feed nozzles are used to inject a combustible material (such as, for example natural gas, fuel oil, other liquid fuels, or coal fines via a pneumatic conveyance) into the chamber. In this example, the feed nozzles are positioned upstream from the cooling coil, however, in other embodiments the feed nozzles can be positioned at various locations along the wall of the chamber. Pipe 114 is configured to deliver coolant to the cooling jacket while pipe 118 is configured to return coolant to the tuyere water cooling system.

A plasma torch 116 is positioned along the axis of the chamber. In this embodiment, the plasma torch is configured to deliver the plasma plume near the exit of the tuyere. The converging nozzle exit 84 encourages mixing of the plasma heated gases with the shroud gases and the injected constituents delivered via pipe 102. In addition, this nozzle increases the velocity of the exiting gases for increased penetration into the carbonaceous bed.

The tuyere chamber may extend at least partially through the refractory lining of the reactor vessel, or the chamber may abut the reactor vessel's outer wall when there is an opening in the vessel wall and refractory lining which registers with the open end of the chamber.

The tangentially disposed shroud gas plenum provides a swirling motion to the shroud gas entering the plenum chamber producing a temperature profile across the chamber which is substantially hotter in the central portion thereof than adjacent the walls. The refractory material adjacent to the wall of the chamber may be made of two or more refractory liners facilitating replacement of the inner lining which is subject to wear.

In the described embodiments, hot gases from the plasma torch can be used to ignite the combustible material within the tuyere. In effect, the torch can act as a standing pilot. This eliminates the need for a flame sensor.

Alternatively, a separate igniter could be provided within the tuyere. In that case the shroud acts essentially as a burner. When using natural gas as the combustible material, this would also necessitate the need for a method of proving that there is a flame and the natural gas is being combusted, such as flame monitoring via flame rod or similar device. Provision for an igniter and flame rod/scanner would be via a passageway through the tuyere nozzle and extending through the tuyere cooling jacket into chamber 74.

The start-up torches can be used during hot idle of the reactor vessel, which is not an option with start-up burners that are typically removed after initial heat-up of refractory. In addition, the start-up torches can be used for supplemental bottom heat at any time. The start-up torches can also supply equivalent torch energy during torch removal if desired. Furthermore, the start-up torches can allow a re-start from a lower temperature (below hot idle) before needing to re-install separate top burners.

When the plasma torch is used as a standing pilot, "torch on" and "shroud air on" conditions must be met prior to introduction of the combustible material. That is, combustible material should not be introduced until a predetermined amount of shroud air is introduced and the torch is running. This ensures that when the combustible material is introduced the conditions will be right for combustion. The combustible material flow rate can be set in accordance with the amount of shroud air flowing. Excess air refers to any amount of air in excess of the stoichiometric amount needed for complete combustion. The combustible material flow can be shut-off in response to a loss of torch running, loss of air, or a flue gas composition deviation. Flue gas composition can be monitored for verification of combustion up to the auto ignition temperature. Calculated oxygen and carbon dioxide content in the flue gas based on air and fuel inputs can be compared to measured values in the flue gas.

Interlocks can be provided to control the operation of the start-up torch. These interlocks can be hard wired or programmable logic controller based. If the torch power is not on OR if the shroud air is not flowing, the combustible material shall be prevented from flowing into the tuyere. Combustible material should not be introduced unless there is a given amount of shroud air and the torch is running, as these will ensure that when the combustible material is introduced, the conditions will be right for combustion. Alternatively, if an igniter/flame sensor option is provided, standard burner management protocols should be employed for start-up and operation of the tuyere as a conventional burner.

Output gas from the vessel can be monitored for composition. If the combustible material is natural gas and methane is present in the output gas, then natural gas is not being fully combusted within the vessel and there is likely an issue to be addressed (e.g., insufficient air flow, lack of an ignition source, . . . etc.). In embodiments that do not have a flame sensing device (e.g., UV sensor or flame rod), in addition to ensuring that the torch is on and that the air fuel ratio is correct to ensure combustion, the flue gas composition can be calculated based on the total air and fuel into the vessel and measured values compared this calculation (e.g., % $CO_2$ and % $O_2$) as a further safety check that the fuel is in fact burning. Once the process is above the auto ignition temperature for the combustible material (e.g., 1,400° F. for natural gas which includes a safety margin), the ignition source (torch) could be turned off and combustion will be ensured as long as the air to fuel ratio is correct. Oxygen in the flue gas indicates excess air flow, which is desirable on start-up. $CO_2$ (rather than CO) indicates complete combustion of fuel.

High turbulence conditions near the tuyere exit provide for excellent mixing of the combustible material and air. There is no need for premixed fuel/air within the tuyere shroud space.

The use of start-up torches can eliminate the bottom start-up burners and associated congestion of tuyeres and plasma torches at the bottom section of the gasifier or vitrification vessel. The use of start-up torches can also eliminate the need to install and remove bottom start-up burners, thus avoiding the need for a bottom burner removal system to manipulate heavy burners by crane, relieving some of the overhead congestion in the area. This can save time during start-up.

In one embodiment, the start-up torches can supply for example 10 MM BTU/Hr Total at the reactor bottom. That embodiment would include three tuyeres for start-up, with the start-up torches having the following operating parameters:

3.33 MMBTU/hr each [3.51 GJ/hr]
23,000 BTU/lb Natural Gas HHV (High Heat Value) [53.5 MJ/kg HHV]
145 lb/hr Natural Gas per Tuyere [65.8 kg/hr]
16.88 lb Air/Lb Natural Gas [16.88 kg air/kg natural gas]
2,450 lb/hr Air per Tuyere (stoichiometry) [1111 kg/hr]
3,670 lb/hr Air Available. [1665 kg/hr]

While particular aspects of the invention have been described above for purposes of illustration, it will be evident to those skilled in the art that numerous variations of the details of the present invention may be made without departing from the invention as defined in the appended claims.

What is claimed is:

1. An apparatus comprising:
    injecting a combustible material into a plurality of tuyeres in a wall of a reactor vessel;
    using a plasma torch to inject a hot gas into the tuyeres to ignite the combustible material; and
    directing heat from combustion of the combustible material into the reactor vessel to preheat the reactor vessel, wherein flue gas composition is monitored for verification of combustion up to an auto ignition temperature of the combustible material.

2. The method of claim 1, further comprising:
    using shroud air to cool walls of the tuyeres and to supply sufficient air for combustion of the combustible material.

3. The method of claim 2, wherein shroud air is introduced into the tuyere prior to injecting the combustible material.

4. The method of claim 2, wherein the combustible material flow rate is set in accordance with an amount of shroud air.

5. The method of claim 1, wherein calculated oxygen and carbon dioxide based on shroud air and combustible material inputs is compared to measured values in the flue gas.

6. A method comprising:
    injecting a combustible material into a plurality of tuyeres in a wall of a reactor vessel;
    using a plasma torch to inject hot gas into the tuyeres to ignite the combustible material; and
    directing heat from combustion of the combustible material into the reactor vessel to preheat the reactor vessel, wherein the plasma torch is turned off when an auto ignition temperature for the combustible material is reached in the tuyeres.

7. The method of claim 2, wherein shroud air is injected in a tangential direction for mixing of the shroud air with combustible injected gases.

8. The method of claim 2, wherein the torch is positioned in the tuyere to increase the velocity of the shroud in an annular space formed between the torch and the tuyere.

9. The method of claim 8, wherein increased velocity enhances cooling of the tuyere and enhances mixing of the combustible material.

* * * * *